March 10, 1942.   F. J. BACHMANN   2,275,488
AUTOMATIC TURN SIGNAL
Filed Sept. 1, 1939   2 Sheets-Sheet 1
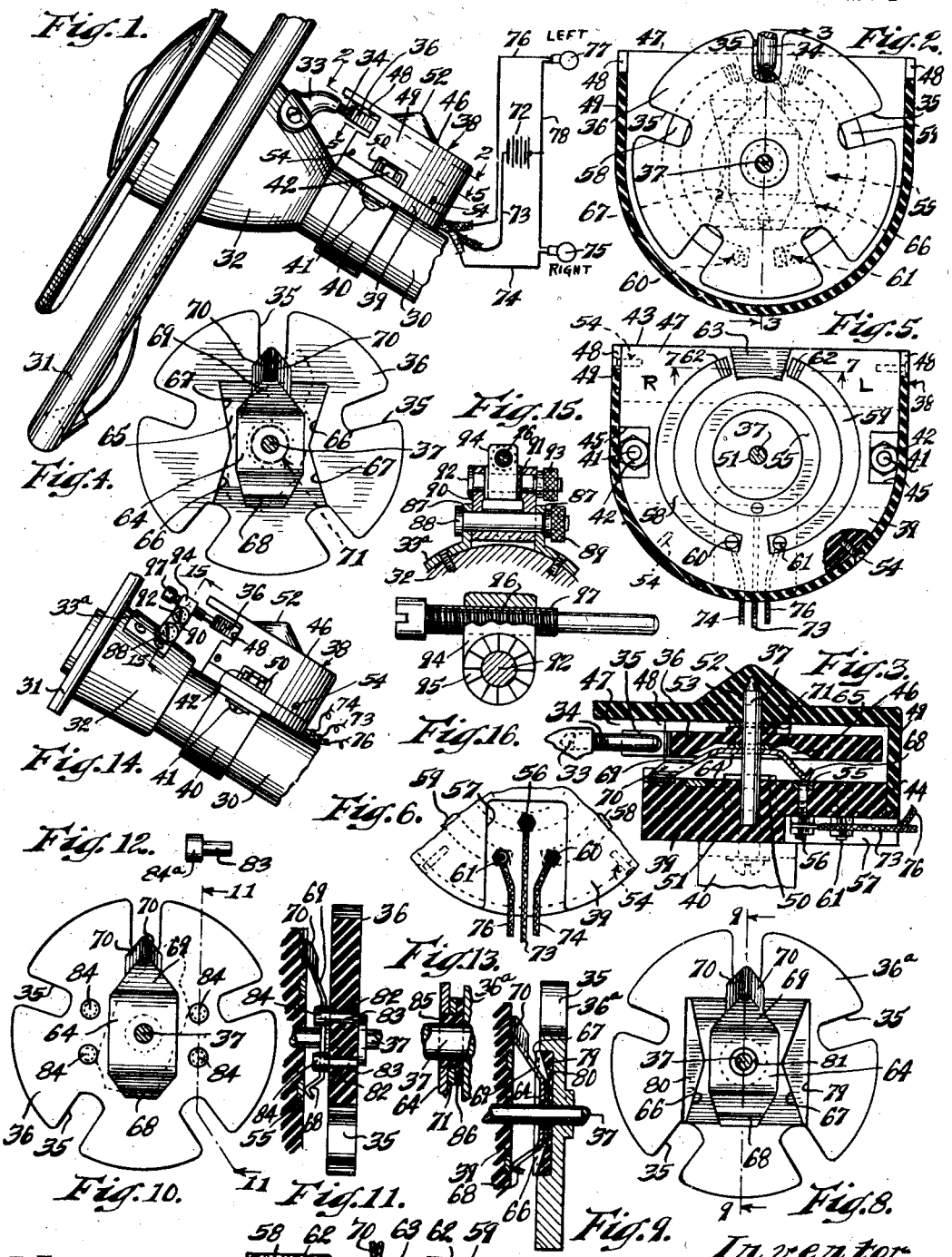
Witnesses:
C. E. Wessels.
Janet McKay
Inventor:
Frank J. Bachmann,
By Joshua R. H. Potts
his Attorney.

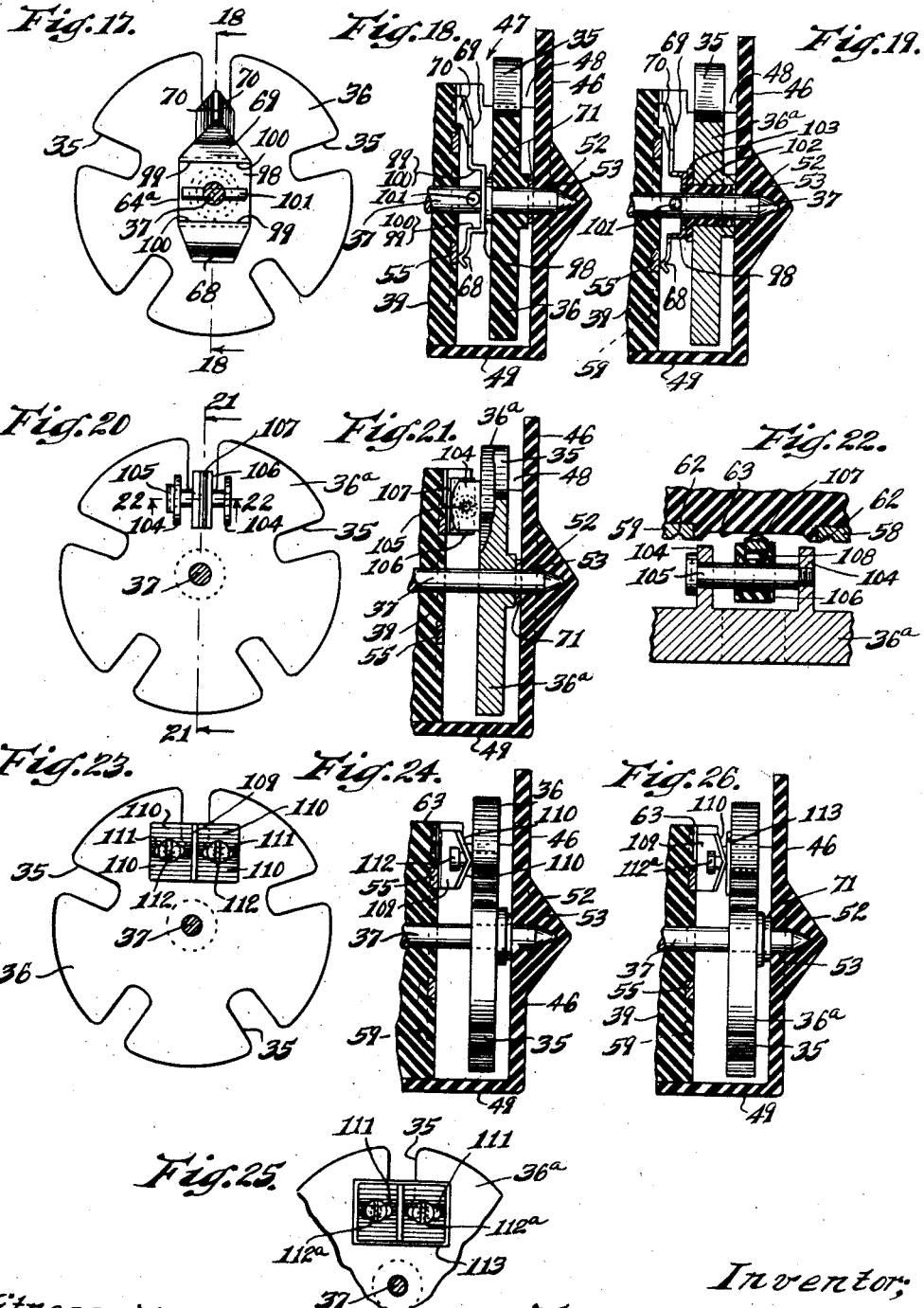

Patented Mar. 10, 1942

2,275,488

UNITED STATES PATENT OFFICE 2,275,488

AUTOMATIC TURN SIGNAL

Frank J. Bachmann, Chicago, Ill.

Application September 1, 1939, Serial No. 293,041

13 Claims. (Cl. 200—59)

My invention has reference to an automatic turn or direction signal or indicator for vehicles and particularly automobiles and the purpose is to provide a thoroughly practical, simple and inexpensive device of this character which may be easily mounted on the steering column and wheel or hub thereof to operate the signal when the steering wheel is turned slightly in either direction before making a turn or when making a turn or appreciably changing the course of the vehicle from a straight line, but which will not operate on slight deflections to the right or left.

My invention also has for an object to provide a lost motion or play between the contacts of a switch for opening or closing an electrical circuit to signal devices, pointers or lights indicating a turn to either side, so that the steering wheel may be turned slightly without undesirably operating a signal when it is not intended to make a turn sharply into or off of an intersecting street or road or from one lane to another.

Another object is to provide for a delayed or lost motion preliminarily to operating the signal in either direction and to keep the signal lighted until a turn is completed and the car is straightened out after the turn instead of extinguishing the signal after a turn is started, as well as to maintain the operating parts or gear always in cooperative relation irrespective of the degree of moving or turning of the steering wheel.

A still further object of the invention is to provide an automatic turn signal or direction indicator for automobiles which will operate automatically upon turning the steering wheel, and especially one which will signal a turn in either direction slightly in advance of or before actually making a turn or turning the vehicle in its travel from a straight line to either side, and which is applicable to automobiles in which the steering gear is such as to permit the steering wheel to make more than one and even two or three turns and which even under such circumstances will always remain or be in position for operation or operative engagement.

Further objects and advantages will appear and be brought out more fully in the following specification, reference being had to the accompanying drawings, in which:

Fig. 1 is a side view of a portion of an auto steering wheel and standard with the automatic turn signal applied thereto and showing the electrical circuit diagrammatically;

Fig. 2 is an enlarged section taken on the line 2—2 of Fig. 1;

Fig. 3 is a section taken on the line 3—3 of Fig. 2;

Fig. 4 is a bottom plan view of an operating member or star wheel and movable contact;

Fig. 5 is an enlarged section taken on the line 5—5 of Fig. 1;

Fig. 6 is a fragmentary bottom plan of the switch box;

Fig. 7 is an enlarged section taken on the line 7—7 of Fig. 5;

Fig. 8 is a view similar to Fig. 4 of a modification;

Fig. 9 is a section taken on line 9—9 of Fig. 8, with the stationary contacts added;

Fig. 10 is a view similar to Figs. 4 and 8 of another form;

Fig. 11 is a section taken on line 11—11 of Fig. 10;

Fig. 12 is an elevation of an enlarged pin;

Fig. 13 is a fragmentary section of another form;

Fig. 14 is a view similar to Fig. 1 of a modification;

Fig. 15 is a section taken on line 15—15 of Fig. 14;

Fig. 16 is an enlarged detailed sectional elevation of the operating arm;

Fig. 17 is a view similar to Figs. 4, 8 and 10 of a different form;

Fig. 18 is a section taken on line 18—18 of Fig. 17;

Fig. 19 is a view similar to Fig. 18 of a modification;

Fig. 20 is a view similar to Figs. 4, 8, 10 and 17 of another form;

Fig. 21 is a section taken on line 21—21 of Fig. 20;

Fig. 22 is a section taken on line 22—22 of Fig. 20;

Fig. 23 is a view similar to Fig. 4 of another form;

Fig. 24 is a side view of Fig. 23, with the cap in section;

Fig. 25 is a fragmentary view similar to Fig. 23 of another form, and

Fig. 26 is a view similar to Fig. 24 of the form shown in Fig. 25.

Referring more particularly to the drawings, 30 designates a steering standard, column or post, which is stationary and 31 a steering wheel thereof having the usual connection through the hub 32 with the steering gear, including the usual worm gear or otherwise, with the front or steering wheels of the automobile as is common in the art. While this device is applicable to any automobile, it is of particular moment that it is especially capable of application to modern automobiles in which the steering wheel makes more than one turn and usually two or three turns whereas most of the prior devices in this art merely take into consideration that the steering wheel makes only one turn or a part of a turn, that is less than a turn instead of more than one turn, and as before stated, even up to three turns or possibly more. An arcuate bracket 33 is suitably fixed to the wheel or hub, that is the rotating part of the steering mechanism and is shown in the form of plate having apertured ears screwed, pinned or otherwise fastened to the hub and offset at the front upwardly, outwardly or forwardly and downwardly therefrom somewhat in the manner of a socket, diecasting or stamping having a fixed or adjustable arm 34 in the form of a downwardly outwardly and forwardly extending pin or detent disposed in an offset position radially from the steering standard and substantially parallel thereto and then extending axially thereof.

This arm or pin is designed to cooperate with another member to form an operating unit and is adapted to engage any one of a plurality of radial notches 35 equidistantly spaced around the periphery of a star wheel or disc 36 preferably of insulation such as fibre, Bakelite, hard rubber, porcelain or other refractory or dielectric material although in some instances it may be of metal, cast, stamped out or otherwise formed. This disc 36 is fixed to a stub shaft 37 disposed substantially normal to the steering column, steering shaft and arm or pin and parallel to the plane of the steering wheel. This shaft is mounted to turn in a relatively small case or box 38 as shown in Fig. 1 and including a base 39 attached to the steering column on top as by means of a clamp 40 having apertured ears receiving bolts 41 which also extend through holes in the base on opposite sides and are clamped by nuts 42. The case is substantially circular with a flat side 43 at the top, although any other suitable shape may be employed. The remaining edge of the base is provided with a rabbet or recess 44 in the top and having communicating side notches 45 to accommodate the nuts 42. A cap 46 forming the top of the case and similarly shaped to fit the base, is mounted on the latter at the recess 44 and has an opening 47 at the flat side. It also has notches 48 in the sides communicating with the opening and the lateral wall or flange 49 depending from the top wall except at the open side 47 has diametrically opposite bottom edge recesses 50 which accommodate the nuts 42 so that the latter may project outwardly for manipulation. The case forms upper and lower bearings or mountings for the shaft 37 and has a bore 51 in the base forming a lower bearing and the cap or cover has a boss 52 with a bore 53 forming a bearing for the upper end of the shaft. The cap may be held at the base in any suitable way so as to be readily detached and is shown fastened by screws 54 passing through holes in the flange of the cap and into the base at the edge thereof adjacent to recess 44.

As shown, the case is preferably of some insulation or dielectric material, such as Bakelite or the like, previously referred to, and has a circular stationary electrical contact 55 of some good current conducting metal seated or molded therein concentric to the axis of the shaft 37 and provided with a binding post or terminal 56 extending through the base and into a recess 57 at the bottom thereof. Outwardly of this inner contact are two spaced semi-circular outer contacts 58 and 59, of corresponding material and similarly mounted but having their ends spaced apart as shown, arranged concentric to the inner contact and the axis. The right hand contact 58 for operating the right hand signal, as will be later described, has a binding post 60 at one end mounted in the same manner as the binding post 56 and the left hand contact 59 has a similar binding post 61. The opposite end of each contact 58 and 59 is provided with a V-shaped notch 62 and a recess or depression 63 is provided therebetween with relatively abrupt beveled shoulders at the ends or opposite sides thereof as seen in Figs. 5 and 7 of the drawings.

A movable contact 64 is loosely mounted on the shaft 37 and is preferably in the form of a bow of spring metal. This contact has its intermediate portion flat and apertured to take the shaft and seat in a notch 65 which is wider than the contact and shaped in the form of two truncated portions meeting at the truncations or opposite dovetails having opposed diagonally opposite and divergent shoulders or edges 66 and 67 with the diagonally opposite edges parallel to each other to engage the opposite edges of the contact 64. This notch or depression 65 is provided in the bottom face of the star wheel or disc 36. One angular or bent end 68 forming a short arm of the movable contact 64 and extending at an obtuse angle from the intermediate portion has a bent end 68 which engages or rides on the circular inner contact 55 at all times. The other long arm or end 69 is similarly bent with respect to the intermediate portion and is pointed as well as provided with oppositely beveled sides 70 and the contact is preferably of substantially oppositely tapered formation with interposed anti-friction metal washers 71 to permit free turning of the parts bearings thereon against undue wear.

The device is connected in an electrical circuit including a source of energy shown as a battery 72 having a lead 73 to the binding post 56 and end 68 of the movable contact 64. A similar conductor or wire 74 leads from the terminal 60 of the contact 58 with which the end 69 is adapted to engage and connects to an electric light bulb, illuminated signal or pointer 75 which when illuminated is adapted to indicate a right turn. A similar conductor 76 leads from the terminal 61 of the contact 59 to a light 77 for indicating a left turn and these lights or indicators may be provided in any suitable number and at any desirable points on the car. Lights 75 and 77 are connected by a return wire 78 to the battery 72.

Thus, in the operation of the device, as described, ordinary deflections from straight travel will not operate the signals due to the fact that there is a lost motion or play between the arm 34 and the edges of the notches 35, but more particularly between the sides of the movable contact 64 and the edges 66 and 67 of the depression or recess 65 permitting partial turning of the star wheel or gear 36 relative to the movable contact 64 and between the latter and the shaft before the edges or shoulders are engaged with the opposed parallel rectilinear edges of the movable contact 64 at its intermediate portion. Also, the long arm 69 of the movable contact can operate in the recess 63 between the ends of the contacts 58 and 59 and will be momentarily checked by the ends or shoulders at the sides of the recess 63 as will be obvious from Fig. 7 of the drawings. This will prevent signaling when driving on a straightway and permit the regular slight turns of the steering wheel to prevent operation of the signals unless turning sharply from one lane to another or into an intersection. When the edges 66 or 67 engage the opposite edges of the movable contact depending upon which direction the steering wheel is turned and the number of revolutions imparted thereto, the tapered portions or opposite bevels 70 and the resiliency of the movable contact will permit the long arm to ride in the recess 63 and after being momentarily held at the shoulders of the recess before passing over the shoulders on to one of the contacts 58 or 59 for indicating a right or left turn by closing the circuit therethrough and through the contact 55 to either one of the signals as it is thought will be obvious. However, the long arm of the movable contact at portion 70 will momentarily engage and be held in one of the V-notches 62 when the circuit is first closed to give a delayed movement to the movable contact and also insure that when the arm 34 leaves one of the notches 35 the latter will be in proper position to mesh or interengage in the manner of a gearing. When the movable contact is engaged with one of the notches 62, the pin or detent 34 will have left the adjacent notch 35 and a complete rotation of the steering wheel will be necessary in order to cause the pin to again engage a notch 35 for intermittently advancing the star wheel and in partially rotating the same to cause the movable contact to be moved in sectors or segments of the contacts 58 and 59 as well as the contact 55 for continued operation of the signals. The recesses 48 provide the necessary clearance for the arm or pin 34 at the open casing of the switch. Reverse rotation of the steering wheel will return the parts to normal position when the wheels of the automobile are in alignment and therefore the rotatable parts are free to oscillate and the geared parts will be moved intermittently in stepped relation but the star wheel and arm will always properly engage at each revolution of the steering wheel in either direction. The driver will also be enabled by reason of the play in the parts to give a signal for turning by a quick slight turn of the steering wheel before starting to actually turn the vehicle. The signal lights will be kept lighted until a turn is completed and the car straightened out after the turn although slight deflections from the direction of travel will not operate the signals.

In Figs. 8 and 9 of the drawings, whereas the star wheel 36 as previously described is preferably of insulation, the star wheel 36a may be of metal or current conducting material and provided with a recess 79 of rectangular or any other suitable shape in which an insulation block 89 is set with a bushing 81 electrically separating the movable contact 69 and the shaft 37. The insulation block or plate may be oppositely beveled or provided with shoulders as preferred at the ends thereof, in addition to having the opposed edges or shoulders 66 and 67 intersecting each other for permitting play or lost motion between the turning of the steering wheel and the operation of the movable contact and thus also between the arm or detent 34 and the star wheel 36a and between the latter and the movable contact.

In Figs. 10 and 11 of the drawings another form or modification of the invention is shown in which the star wheel is provided with a plurality of spaced holes or sockets 82 shown as four with opposed sets designed to receive pins 83 having heads 84. If the star wheel is of insulation the pins may be of metal and vice versa providing the parts are suitably insulated between the star wheel and shaft and the movable contact so that the circuit will not be shorted or closed except by the movable contact bridging the stationary contact 55 and either one of the other stationary contact 58 or 59. If the star wheel is of metal the pins may be of insulation or insulated from the star wheel at the holes. By varying the size or diameter of the pins or heads thereof, the relative movement between the star wheel and the movable contact and thus the play or amount of lost motion may be adjusted or regulated as desired.

In Fig. 12 one of the pins 83 is shown provided with a larger head 84a than the heads 84 shown in Figs. 10 and 11 to restrict the movement or adjust the same.

In Fig. 13 of the drawings the star wheel 36a is of metal and as previously referred to, a flanged bushing 85 is provided between the shaft 37 and the star wheel and movable contact, the flange 86 being interposed between the star wheel and one of the washers 71 heretofore referred to.

In Figs. 14, 15, and 16 of the drawings, the pin or detent of the arm 34 as previously described is of a modified construction to give certain desired adjustments angularly and radially as compared to the construction shown and described in connection with Figs. 1 and 3 of the drawings. In this form, the bracket 33a is similarly fastened to the steering wheel or its hub 32 and has upstanding parallel apertured ears 87 which receive a bolt 88 engaged by a knurled nut 89. A forked link 90 is pivotally mounted on the bolt 88 in outstanding position and has a notched burr 91 on the inner face of one of its tines, forks or arms. These tines are apertured to form corresponding ears or jaws which are slightly resilient or capable of being flexed and take a bolt 92 corresponding to but smaller than the bolt 88 and engaged by a similar knurled nut 93. An arm 94 has a notched face or burr 95 coacting with the burr 91 and both the link 90 and arm 94 are capable of angular adjustment relatively while the arm 94 is provided with a threaded bore 96 at right angles to the bolts or pivot axes of the link and arm respectively to receive an adjustable threaded pin, detent or arm 97 shown in the form of a screw slotted to take a bit of a screw driver or otherwise formed to be easily manipulated or turned with the fingers to obtain the necessary radial adjustment of the pin with respect to the notches of the star wheel and to render the device capable of application to steering wheels having different types of hubs as suggested in Figs. 1 and 14 of the drawings. This construction permits two adjustments angularly toward and away from the star wheel of the pin and will vary the inclination of the pin so that it may be disposed longitudinally in the plane of the star wheel to properly register with the notches thereof so as to properly gear with one another and so that the projection of the pin into a notch and the degree of rotation imparted to the star wheel with corresponding movement of the steering wheel and the pin or arm with the hub thereof may be properly regulated.

In Figs. 17 and 18 of the drawings another form is shown in which means is provided for limiting or controlling the amount of free movement of the movable contact, that is, the lost motion or play between the star wheel and the movable contact. In this form the star wheel 36 is of insulation and the movable contact 64 has an offset channel or depression 98 formed by a stamping or otherwise and opposed walls or shoulders 99 and 100 corresponding to the shoulders 66 and 67 previously described. However, in lieu of having the movable contact operate in a recess or depression in the star wheel at the bottom face thereof with beveled or inclined ends as shown and as previously described, the pin 101 is extended through a diametrical aperture in the shaft 37 within the depression 98 provided directly in the movable contact and the ends of the pin project outwardly at opposite sides to engage the opposed edges or shoulders 99 and 100 of the recess or depression 98 after a partial turning of the star wheel from the steering wheel. Otherwise the operation is the same.

In Fig. 19 of the drawings the construction is the same as in Figs. 17 and 18, except provision is made for the use of a star wheel of non-insulative material, that is metal, in which case the star wheel 36a may have the pin 101 also of metal. An insulating bushing or sleeve 102 is also disposed as a bearing for the star wheel around the shaft 37 to electrically separate the two and the angular bushing has a radial flange or washer 103 disposed between the star wheel and the offset portion of the movable contact to insulate the two. As in the constructions previously described, the star wheel will be insulated from the circuit and this of course prevents travel of current to the driver as well as preventing a short circuit which would interfere with the operation of the signals or leakage.

In Figs. 20, 21 and 22 of the drawings another modification is shown offset radially from the axis of the star wheel or by disposing the movable contact and fastening the same at a point upon the star wheel which does not pivot about the center thereof. In this construction the star wheel 36a is of metal and has two spaced parallel lugs or apertured ears 104 suitably provided thereon and offset from the center axis as portions of correspondingly related chords of arcs or sectors of the star wheel. These lugs receive a cross pin or bolt 105 and loosely mounted on this pin for play is a block of insulation 106 having an insert 107 set in a groove thereof and forming a metal contact to straddle or bridge the stationary contacts 55 and 58 or 59. The contact 107 may rock on the pivot as well as move toward and away from said stationary contacts and the face of the star wheel may be spring-pressed as shown at 108 with a bow or other shaped spring to insure engagement with both stationary contacts to either the right or the left hand signal.

In Figs. 23 and 24 of the drawings another form of switch structure is shown of which the star wheel 36 is of metal and in which the bridging member is mounted in the same relative position as disclosed in Figs. 20 to 22 inclusive. However, in this form the bridging member or contact 109 may be diecast or stamped from sheet metal and as in the other forms has a tapered or oppositely beveled contact portion as in connection with the long arm of the movable contacts 64 and 64a. It also has oppositely inclined or beveled portions or wings 110 forming a rocker so that it may pivot or rock on the face of the star wheel to insure engagement with the pairs of stationary contacts to close the circuit across the same to either signal. In this form the wings or plate portions of the bridging member at the crotch or verge are provided on opposite sides of the contact portion 109 with alined elongated slots 111 by which the bridging member or movable contact is slidably mounted on pins or screws 112 carried by the star wheel to operate in the same manner as does the movable contact 107 previously described.

In Figs. 25 and 26 of the drawings, the parts are all the same construction as shown in Figs. 23 and 24 except that the star wheel 36a is of metal instead of insulation and in this case the the movable contact 109 has insulated pins 112a and an insulating washer 113 is mounted on the pins against the face of the star wheel and insulates the latter and the movable contact electrically.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim is new and desire to secure by Letters Patent is:

1. In an auto turn signal a steering standard, a steering wheel thereon, an arm fixed to the wheel and extending above and in spaced relation to the standard, and a switch mounted on the standard having a wheel member actuated by the arm to close an electrical circuit to one or more signals, said switch including stationary contacts and a diametrical movable contact for bridging the same, said wheel member having a notch wider than the movable contact and shaped in the form of two truncated portions meeting at the truncations and means for engaging the movable contact to restrain it from movement for a short interval in an inoperative position, said contacts including three stationary contacts, two of which are spaced apart for right and left signals and adapted to cause continued operation of the signals while the steering wheel is turned and the movable contact is bridging the other stationary contact and either one of said spaced contacts.

2. In an auto turn signal a steering standard, a steering wheel thereon, an arm fixed to the wheel and extending in spaced relation to the standard, and a switch mounted on the standard and having a disk member actuated by the arm to close an electrical circuit to one or more signals, said switch including stationary contacts and a movable contact for bridging the same, said disk member having a depression in the shape of opposite dovetails having opposed diagonally opposite shoulders substantially parallel to each other to engage opposite edges of the movable contact and means for momentarily checking the movement and holding the movable contact engaged with either stationary contact to enable a driver to give a signal for turning by a quick slight turn of the steering wheel before starting to turn the vehicle.

3. In an auto turn signal, a switch mounted on a steering standard, a steering wheel, an arm on the steering wheel, a pair of stationary contacts, a shaft, a star wheel engaged by the arm and mounted on the shaft to rotate, a movable contact mounted on the shaft and spaced abutments between the star wheel and movable contact to permit limited movement of the star wheel in either direction before the abutments engage and move the movable contact into engagement with the stationary contacts.

4. In an auto turn signal, a steering wheel and standard, a switch mounted thereon including an arm fixed to the steering wheel, a pair of spaced stationary contacts and another stationary contact, a shaft, a star wheel mounted on the shaft to rotate and engaged by the arm, a movable contact loose on the shaft and means to mount the movable contact on the star wheel to permit limited movement of the star wheel before engaging and moving the movable contact into engagement with the stationary contacts.

5. In an auto turn signal, a steering wheel having a hub, a steering standard, a switch mounted on the hub and standard, an arm carried by the hub, stationary contacts, a star wheel mounted to turn by engagement of the arm therewith on turning the steering wheel, a movable contact adapted to engage the stationary contacts and mounted to turn with the star wheel at times, and means between the star wheel and the movable contact to permit limited movement of the star wheel independently of and relative to the movable contact in either direction before engaging and moving the movable contact into engagement with the stationary contacts.

6. In a switch for turn signals adapted to be mounted on a steering wheel and column including an arm on the steering wheel, a housing mounted on the column, spaced stationary contacts in the housing, a shaft, a star wheel mounted on the shaft to turn within the housing and engaged by the arm, a movable contact loose on the shaft and means including spaced abutments between the star wheel and movable contact to permit limited movement of the star wheel in either direction before engaging and moving the movable contact into engagement with the stationary contacts.

7. In an auto turn signal, a switch mounted on a steering standard, a steering wheel having a hub, a bracket immovably mounted on the hub, an arm carried by the bracket and adjustable axially and angularly on a transverse pivot axis relative thereto and the standard, and means actuated by the arm to operate the switch.

8. In an auto turn signal, a switch mounted on a steering standard, a steering wheel having a hub, a bracket immovably mounted on the hub, an arm on the bracket and adjustable angularly on transverse pivots at two points for adjustment toward and away from the periphery of the standard and a star wheel mounted on the standard engageable by the arm to operate the switch.

9. In an auto turn signal, a steering standard, a steering wheel thereon, an arm fixed to the wheel and extending in spaced relation to the standard and a switch mounted on the standard and having a member actuated by the arm to close an electrical circuit to one or more signals, said switch including stationary contacts and a movable contact loosely mounted on the member to provide a lost motion connection therewith for bridging the stationary contacts and means for momentarily checking the movement of the movable contact in a non-bridging position to permit slight turning of the steering wheel without operating the signals.

10. In an auto turn signal, a steering standard, a steering wheel thereon, an arm immovably mounted relative to the wheel and extending in spaced relation to the standard and a switch mounted on the standard and having a member actuated by the arm to close an electrical circuit to one or more signals, said switch including stationary contacts and a movable contact loosely mounted on the member to provide a lost motion connection therewith for bridging the stationary contacts, means for momentarily checking the movement of the movable contact in a non-bridging position to permit slight turning of the steering wheel without operating the signals, one of said stationary contacts being continuous and two other stationary contacts being spaced apart, and means for momentarily checking the movement of the movable contact in a bridging position.

11. In an auto turn signal, a steering standard, a steering wheel thereon, an arm fixed to the wheel and extending in spaced substantially parallel relation to the standard, and a switch mounted on the standard and having a star wheel actuated by the arm to close an electrical circuit to one or more signals, said switch including stationary contacts and a movable contact for bridging the stationary contacts, means for engaging the movable contact to momentarily restrain it from movement adjacent the stationary contacts for a short interval in an inoperative position and means for momentarily holding the movable contact in a slightly advanced operative position to give a signal, said switch causing continued operation of the signal until the turn is completed.

12. In an auto turn signal, a switch comprising the combination with the steering wheel of a vehicle, and including a switch having a pair of spaced contacts and another contact adapted to be connected in an electrical circuit with signals and a source of energy, a star wheel, an arm movable with the steering wheel and normally in gear with the star wheel, spaced abutments and a loosely mounted movable contact operable between said abutments and having spaced portions to engage the abutments after slight movement in either direction to cause the delayed movement of the movable contact and to permit partial turning of the star wheel before engaging and operating the movable contact.

13. A switch comprising a case, spaced stationary contacts, a movable contact, means for actuating the movable contact including a star wheel and means on the star wheel and spaced from the movable contact allowing play between the movable contact and the actuating means, said means comprising a rotatable part, means for actuating the same, said rotatable part having spaced opposed shoulders spaced from the movable contact and adapted to engage the same after partial movement of the rotatable part.

FRANK J. BACHMANN.